No. 807,334. PATENTED DEC. 12, 1905.
A. L. SWANK.
AUTOMATIC WEIGHING SCOOP.
APPLICATION FILED FEB. 23, 1904. RENEWED SEPT. 21, 1905.

2 SHEETS—SHEET 1.

WITNESSES:

INVENTOR.
ARTHUR L. SWANK.
BY
ATTORNEY.

No. 807,334. PATENTED DEC. 12, 1905.
A. L. SWANK.
AUTOMATIC WEIGHING SCOOP.
APPLICATION FILED FEB. 23, 1904. RENEWED SEPT. 21, 1905.
2 SHEETS—SHEET 2.
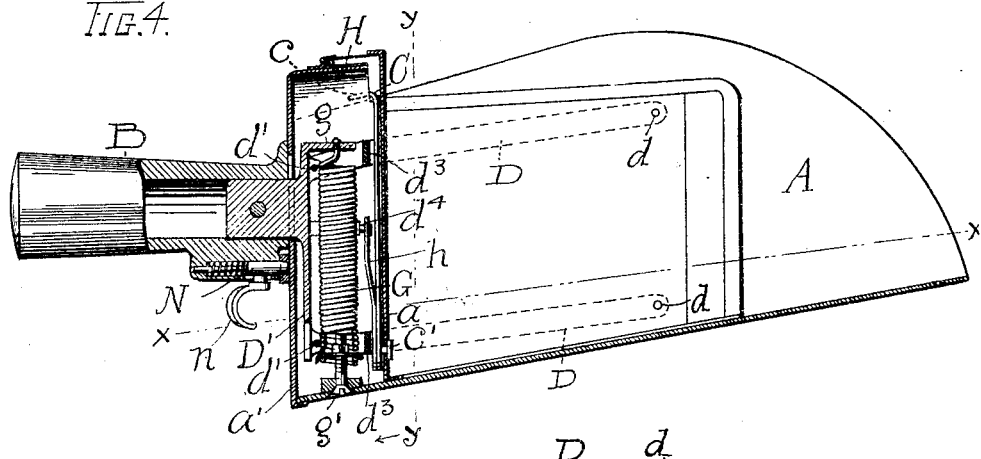
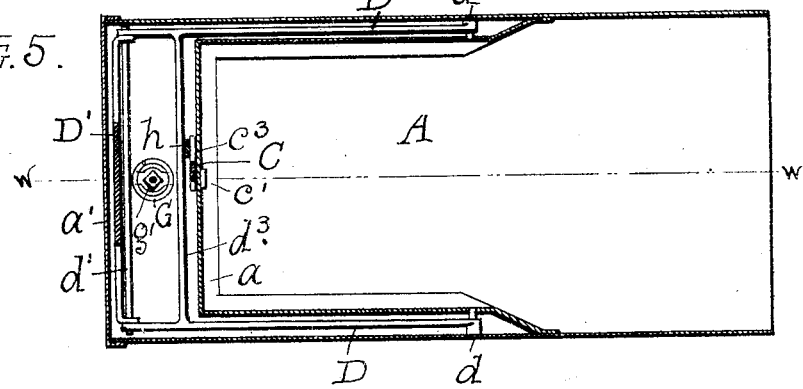
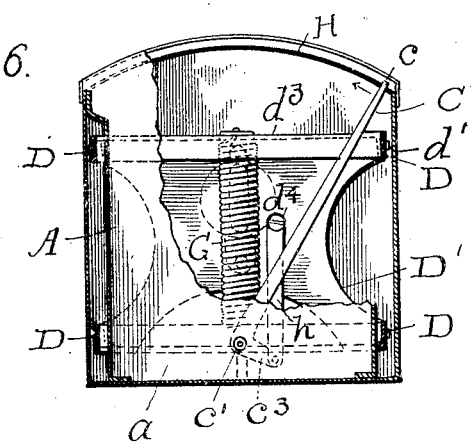
WITNESSES:
INVENTOR.
ARTHUR L. SWANK.
BY
ATTORNEY.

UNITED STATES PATENT OFFICE.

ARTHUR L. SWANK, OF CLEVELAND, OHIO, ASSIGNOR OF ONE-HALF TO H. L. HESS, OF ASHLAND, OHIO.

AUTOMATIC WEIGHING-SCOOP.

No. 807,334.            Specification of Letters Patent.            Patented Dec. 12, 1905.

Application filed February 23, 1904. Renewed September 21, 1905. Serial No. 279,433.

*To all whom it may concern:*

Be it known that I, ARTHUR L. SWANK, a citizen of the United States, residing at Cleveland, in the county of Cuyahoga and State of Ohio, have invented certain new and useful Improvements in Automatic Weighing-Scoops; and I do declare that the following is a full, clear, and exact description of the invention, which will enable others skilled in the art to which it appertains to make and use the same.

My invention relates to means combined with a receptacle for indicating the weight of or other data relative to the contents of the receptacle constructed and operating substantially as shown and described, and particularly pointed out in the claims.

Figure 1:
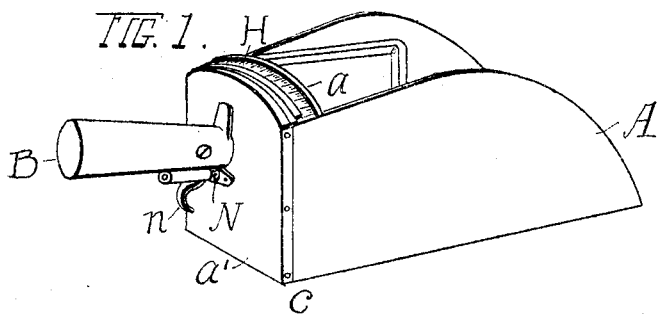
Figure 2:
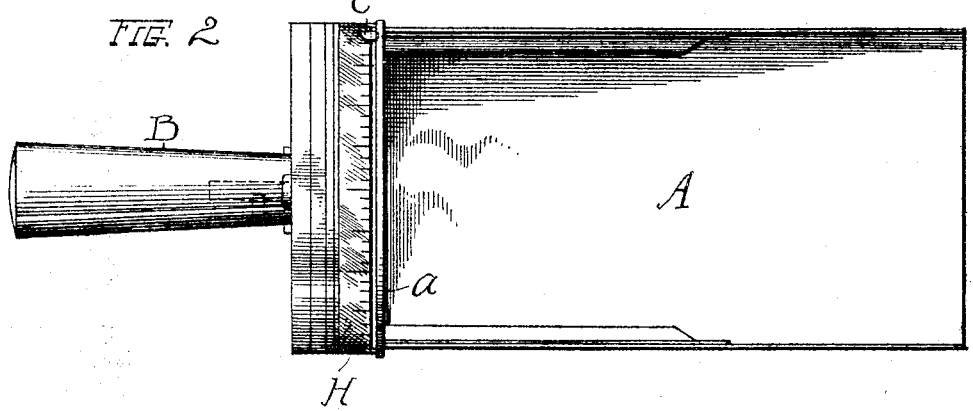
Figure 3:
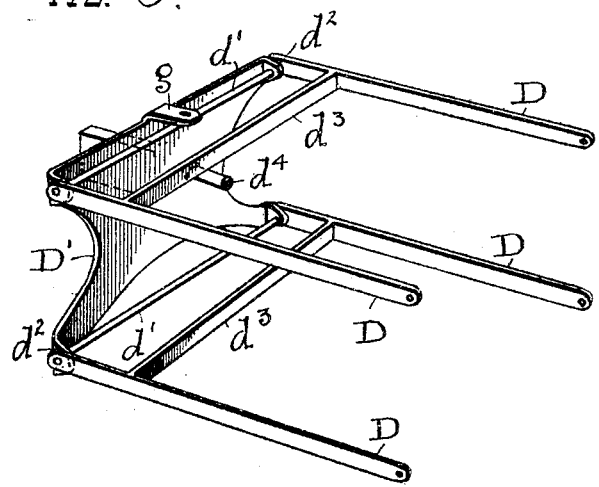

In the accompanying drawings, Figure 1 is a perspective elevation of my new and improved scoop, and Fig. 2 is a plan view thereof, enlarged as to Fig. 1. Fig. 3 is a perspective view of the links and framework of the weighing mechanism. Fig. 4 is a longitudinal sectional elevation of the scoop complete; and Fig. 5 is a view on a line corresponding to $xx$, Fig. 4, looking down. Fig. 6 is a cross-section on line $yy$, Fig. 4.

The invention as thus shown is an improvement on the construction shown in my application, Serial No. 178,136, in particulars, as will hereinafter more fully appear.

A represents the scoop as a whole, and B the handle. These two parts are in movable relation to each other with the weighing mechanism as the interposed connecting part, so that any added weight in the scoop, however small will be accurately weighed and the weight thereof shown by transversely-swinging indicator C. The scoop proper or scooping portion thereof extends forward from the wall $a$, which in the present construction extends across the rear portion of the scoop its entire depth and width and just far enough from the rear wall $a'$ to form a compartment for the weighing mechanism. This compartment is exclusive from the scoop proper, so that not even moisture can enter therefrom, and the inner wall $a$ is also shown in this instance as extending forward at the sides of the scoop and apart therefrom to provide space for securing and operating parallel links D of the weighing mechanism. The said links are two in number on both sides and are pivoted at their front ends at $d$ and at their rear on plate D', to the center of which handle B is rigidly secured in any suitable way. The handle B and the plate D' being in one piece may more properly be termed the "handle-support." In this instance transverse rods $d'$ serve to pivot the parallel links D; but any other suitable connection for said links will suffice.

A closely-wound spiral spring G is shown at the center of the scoop in the rear compartment and connected at its upper end to projection $g$ on plate D' and at its lower end by screw $g'$ to the floor or bottom of the scoop. A vertical slot in the rear wall of the scoop for the handle makes provision for the movement of the scoop up and down in relation to the handle, and it is obvious from the foregoing construction that if weight be added to the scoop and rear plate D' be held up by handle B the scoop will descend against the tension or pull of spring G. It is obvious also that plate D', having the link connections D at top and bottom, will be held relatively according to the length of said links. This leads up to one of the material improvements in the present invention over that shown in my former case, No. 178,136. In the said application I could use only short links of the depth of the rear compartment front to rear; but this produced so much leverage and friction on the bearings of the links that it was difficult to get uniform action in the scoop at all elevations; but by extending the links forward at the sides of the scoop such friction is reduced to the minimum and the weighing mechanism acts equally well and uniformly at all elevations or weights—that is, it will weigh one ounce or twenty ounces with equal and exact accuracy. As here shown, the said links D extend forward to about midway the length of the scoop, The indicator or dial-hand C is pivoted at $c'$ on the inner cross-wall $a$ of the scoop and has a finger $c$ at its top adapted to sweep over the graduated scale or dial H, on which are marks of any suitable denominations, such as ounces and pounds. The said dial or scale is curved to the radius of the indicator from its pivot $c'$, and the construction and arrangement of all the parts is such that when the scoop is empty the indicator will be at one side of the scoop with its finger at zero. A transverse slot is provided for the said indicator, which it is free to traverse without friction, and the entire weighing organization is as sensitive and responsive as the best weighing-scales for small merchandise. The dial-hand or indicator also has a projection $c^3$ at right angles off its pivot $c'$, with which is connected a relatively long link $h$, pivotally attached at its other end to the plate $D'$ on projection $d^4$. It follows when the scoop descends under more or less added weight that there will be a corresponding pull downward on pivot $c'$, and as link $h$ is held up through plate $D'$ and handle B the indicator C will be moved toward the left to tell just what is the amount of the weight added. Now in this particular construction there is further material improvement in the invention. Formerly in the application above referred to the projection $c^3$ on the indicator was slotted and a pin worked in the slot; but I find that this produces so much friction of such irregular character that it materially and injuriously affects the operation, and hence I have shown herein my original but hitherto undisclosed construction for making this connection. This gives the dial-hand or indicator a positive and even movement, as the link is always the same distance from the center and the dial-hand or indicator is caused to move always with the same speed at whatever point it may be in its travel.

A sliding spring-pressed locking-bolt N is supported on handle B and adapted to lock automatically and normally in the back wall of the scoop and serves to make handle B rigid with the scoop for all uses except weighing—that is, the bolt is in locking engagement with the scoop at all times except when weight is being ascertained, and to disengage the bolt it has a finger-hook $n$ in convenient position outside and bottom where the forefinger can easily reach the same and release the bolt for weighing purposes when the scoop has been filled.

The scoop proper comprises the body A and is supported practically by spring G; but the two sets of upper and lower parallel links D participate in this effect or result in that they carry the body of the scoop, with its load, back to the said spring through plate $D'$.

It would be the same construction practically if the body of the scoop were to stop at front wall $a$ and the rear wall and sides were an added part.

In this instance the upper and lower sets of supporting-links D are shown as cross-connected rigidly at their rear by bars or rods $d'$, which helps to balance the scoop evenly between the sides. This practically makes upper and lower link-frames, which are pivoted on the supporting member $D'$ at their rear ends, and this member or support $D'$ carries all the weighing mechanism and has a free play up and down in the scoop and works practically in vertical lines.

While I have herein shown and described a scoop and a weight-scale combined therewith, I do not wish this invention to be limited to any particular kind of receptacle nor to any particular kind of scale that might be used instead of the weight-scale.

What I claim is—

1. The combination of a receptacle, a handle-support therefor, a pair of parallel links on each side of the receptacle connected therewith at their front ends and with the handle-support at their rear ends, the receptacle provided with a compartment inclosing said handle-support, and a spring engaging the receptacle with said support and located in said compartment.

2. The combination of a receptacle, a handle-support at the rear of the receptacle, a set of links of equal length pivoted at their rear ends top and bottom to said support and at their front ends at the sides of the receptacle, a spring connecting said support and receptacle, and an indicator pivotally supported on the receptacle and having actuating connections with the handle-support substantially as described.

3. The combination of a handle-support, a receptacle in movable relations to said support, a pair of links of equal length at each side pivotally connected with the said support at their rear ends and with the sides of the receptacle at their front ends, a spring between said support and receptacle, and an indicator having connections with both the support and the receptacle at its lower end, substantially as described.

4. The combination of a receptacle, weighing mechanism therefor provided with parallel upper and lower supporting-links pivoted at the sides of the receptacle approximately near its middle portion, a support carrying the rear ends of said links, a spring engaged at its respective ends with said support and said receptacle, a handle fixed on said support, and an indicator having operative connection with said support and pivoted on said receptacle, substantially as described.

5. The combination of a receptacle, a handle-support in the rear portion thereof, a pair of links of equal length pivoted at their respective ends on each side to said receptacle and support, a spring connecting the receptacle and support, an indicator supported on the receptacle at the rear and bottom thereof having a lateral projection at its lower end, and a link pivotally connected with said projection and said support, substantially as described.

6. The combination of a receptacle, a separate handle-support therefor in the rear of the receptacle, a spring connected at its respective ends with said support and receptacle, an indicator pivoted at the lower part of the receptacle and operatively connected with said support off the pivot thereof, substantially as described.

7. The combination of a receptacle having a compartment rigid therewith, a support for the receptacle independent of said parts and located in said compartment, upper and lower links of equal length pivoted at the sides of the receptacle and on said support at their respective ends, a spring connecting the receptacle and support in said compartment and an indicator operatively connected with both said receptacle and support, substantially as described.

In testimony whereof I sign this specification in the presence of two witnesses.

ARTHUR L. SWANK.

Witnesses:
R. B. MOSER,
C. A. SELL.